United States Patent Office 2,743,008
Patented Apr. 24, 1956

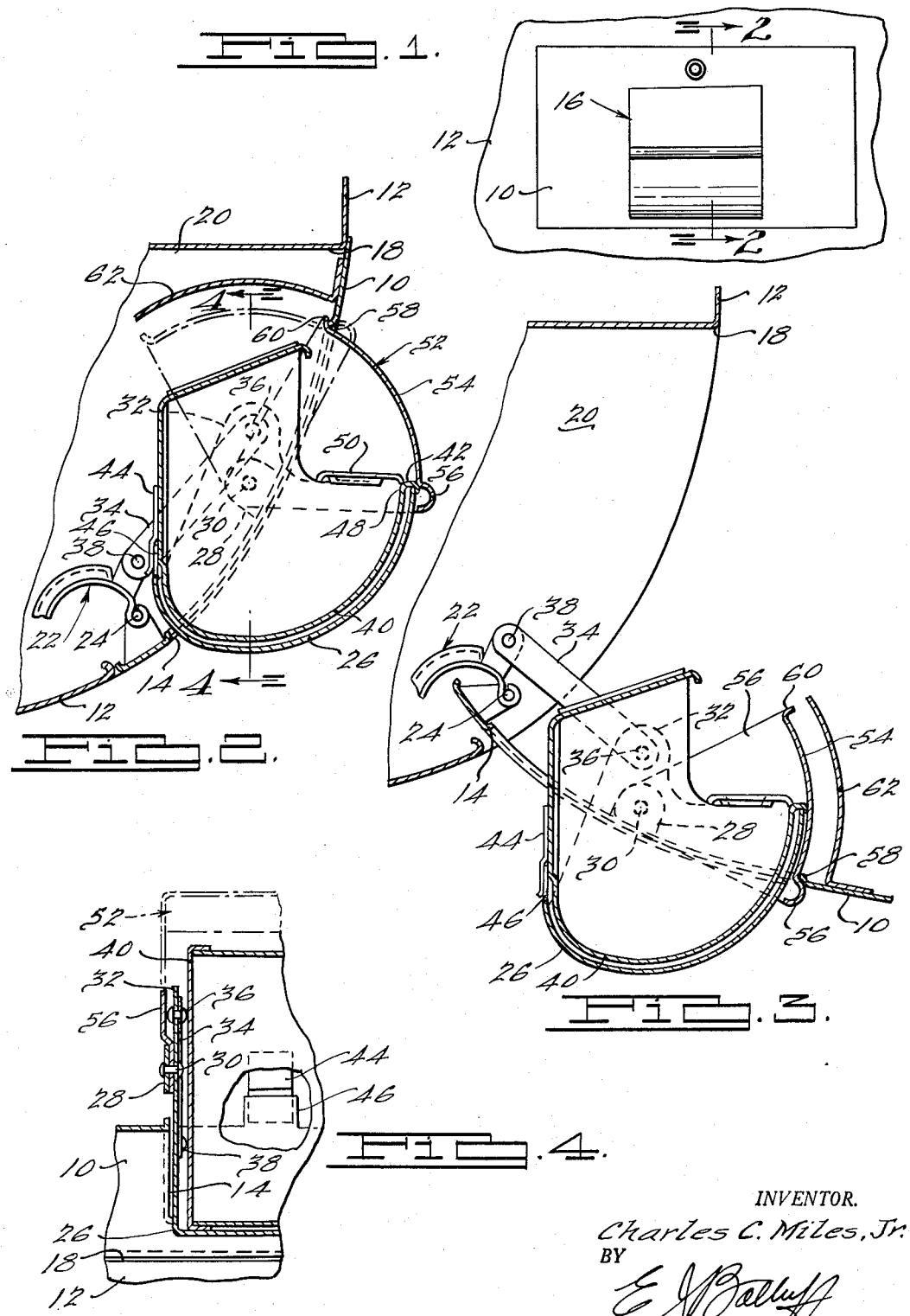

2,743,008
DOOR MOUNTED ASH TRAY

Charles C. Miles, Jr., Detroit, Mich., assignor to F. L. Jacobs Co., Detroit, Mich., a corporation of Michigan Application June 29, 1953, Serial No. 364,856

17 Claims. (Cl. 206—19.5)

This invention relates to ash trays with particular reference to an ash tray assembly adapted to be mounted in the glove compartment door of an automotive vehicle.

Automobiles are conventionally provided with one or more ash trays mounted on the dash panel of the vehicle. In the present construction it is proposed to mount the ash tray assembly within an opening in the door which provides access to the glove compartment customarily built into the dash panel, thus utilizing otherwise unused space on the dash panel and leaving the remainder of the panel and the space behind it free for the disposition of the gauges and control or other apparatus customarily mounted on or behind the dash panel.

Briefly stated, the invention comprises an ash tray assembly pivotally mounted on the glove compartment door within an opening in the door and includes an ash receptacle having an opening accessible from outside the door when the door is closed and linkage means connected to the assembly and to a fixed part of the vehicle for maintaining the receptacle in a substantially upright position as the door is opened and closed, the receptacle being exposed on the inner side of the door when the door is open so as to be accessible for removal at such time. The assembly also includes a cover for the ash receptacle and means for shifting the cover as the door is opened and closed.

A principal object of the invention is to provide a new and improved ash tray assembly for an automotive vehicle.

A further object of the invention is to provide an ash tray assembly adapted to be mounted on the glove compartment door of an automotive vehicle.

Other and further objects of the invention will be apparent from the following description and claims and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is an elevational view of the glove compartment door of an automotive vehicle having the ash tray assembly of this invention mounted therein;

Fig. 2 is a fragmentary sectional view taken on line 2—2 of Fig. 1 and showing the door in its closed position;

Fig. 3 is a view similar to Fig. 2 but showing the door in its open position; and Fig. 4 is a fragmentary sectional view taken on line 4—4 of Fig. 2.

According to the present invention the glove compartment door 10, which is hinged at its lower edge to the dash panel 12, is provided with an opening 14 therein within which the ash tray assembly 16 is disposed. The dash panel has an opening 18 therein providing access to the compartment 20 and the door 10 is hinged at its lower edge to the panel by a suitable hinge structure indicated at 22. The door is pivoted about pins 24 provided at either side of the compartment.

The ash tray assembly 16 comprises a carrier member 26 which may be substantially cup shaped and which is pivoted to the door 10 at the sides of the opening 14 therein by means of ears 28 and pins or rivets 30 disposed on a horizontal axis. The carrier includes upwardly extending arms 32 at either side thereof pivotally connected to links 34 by means of rivets 36. The links 34 at their other ends are pivoted to a fixed part of the vehicle by pins 38 disposed on a horizontal axis. The pivots 24, 30, 36 and 38 form a parallelogram support for the carrier 26 so as to maintain the same in a substantially upright position as the door 10 is opened and closed.

An ash receptacle 40 is removably supported by the carrier 26 and includes a flange 42 formed along the front edge thereof adapted to be fitted over the front edge of the carrier 26. The receptacle 40 may be provided with one or more clips 44 suitably secured thereto and adapted to be fitted over ears 46 provided on the back wall of the carrier 26 for locating and removably supporting the receptacle within the carrier. The receptacle has an ash receiving opening 48 at its upper end and the usual snuffer 50 within the opening 48.

It will be seen that as the door 10 is opened and closed the parallelogram supporting linkage will maintain the carrier and ash receptacle in a substantially upright position as shown in Figs. 2 and 3. When the door 10 is closed, as shown in Fig. 2, the ash receiving opening 48 is adapted to be exposed on the outer side of the door 10 and when the door 10 is opened the opening 48 is exposed on the inner side of the door as shown in Fig. 3.

A cover 52 having a curved top wall 54 and side walls 56 is pivotally mounted on the carrier 26 by the rivets 30 which pivotally connect the carrier to the door. The cover 52 is manually movable between the closed position thereof shown in solid lines in Fig. 2 at which it closes the opening 48 in the receptacle 40, and an open position thereof shown in dotted lines in Fig. 2 in which it exposes the opening 48 in the receptacle and is disposed within the compartment 20 above the receptacle 40. The cover may be provided with a bead 56 at its lower edge for manipulating the cover.

A frictional fit is provided between the cover 52 and the rivets 30 which connect the cover to the carrier 26, so that the cover will remain in any adjusted position thereof. The upper edge 58 of the door opening 14 is adapted to co-operate with the bead 56 formed on the cover so as to pivot the cover relative to the carrier as the door is opened. Regardless of whether the cover 52 is in its open or closed position when the door is closed, the cooperating elements 56 and 58 will pivot the cover into the position shown in Fig. 3 as the door is opened, the cover at such time exposing the upper end of the receptacle 40 and the opening therein so as to permit access to and removal of the receptacle at such time.

The upper horizontal edge 60 of the cover will be engaged by the edge 58 of the door 10 as the door moves from its open to its closed position and the cover will thus be pivoted relative to the carrier to its closed position as shown in Fig. 2 as the door 10 is closed. The ash receptacle and its opening is always exposed outside the compartment 20 and on the inner side of the door 10 when the door is opened, and the opening 48 will always be closed by the cover 52 when the door is moved from its open to its closed position.

A shield 62 is secured to the inner side of the door 10 and when the door is closed is disposed above the receptacle 40 and serves to prevent articles within the compartment 20 from interfering with the pivotal movement of cover 52.

While the invention has been described in connection with the glove compartment door of an automotive vehicle, it will be apparent that the novel assembly described herein might be used in other applications.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In an ash tray assembly adapted to be mounted in the glove compartment door of an automotive vehicle, said door having an opening therein; a carrier member movably mounted on said door, a link pivoted to said carrier and to a fixed part of the vehicle for maintaining said carrier in a substantially upright position as said door is opened and closed, and an ash receptacle removably mounted on said carrier and movable therewith within said opening as said door is opened and closed, said receptacle having an ash receiving opening adapted to be exposed outside said door when the door is closed and to be exposed outside said compartment and on the inner side of said door when said door is open.

2. In an ash tray assembly adapted to be mounted on the compartment door of an automotive vehicle dash panel, said door having an opening therein; a carrier member pivoted to said door for swinging movement in said opening on a horizontal axis, a link pivoted to said carrier and to a fixed part of the vehicle and operable for maintaining said carrier in a substantially upright position as said door is opened and closed, and an ash receptacle removably mounted on said carrier and having an ash receiving opening adapted to be exposed outside said door when the door is closed and to be exposed outside said compartment and on the inner side of said door when said door is open, said receptacle being removable from said carrier from the inner side of said door when said door is open.

3. In an ash tray assembly adapted to be mounted on the glove compartment door of an automotive vehicle, said door having an opening therein; a carrier member, an ash receptacle removably mounted on said carrier and disposed within said door opening and having an ash receiving opening therein adapted to be exposed outside said door when the door is closed and linkage means movably connecting said carrier to said door and to a fixed part of the vehicle for shifting said carrier and receptacle relative to said door for maintaining said receptacle in a substantially upright position as said door is opened and closed, said receptacle being disposed outside said compartment and on the inner side of said door for removal from said carrier when said door is open.

4. An assembly according to claim 3 including a cover for said receptacle pivotally mounted on said carrier for movement between open and closed positions thereof when said door is closed.

5. In combination with a door having an opening therein and adapted to be hinged at its lower edge to a panel having an opening adapted to be closed by the door, an ash tray assembly arranged within the opening in the door and comprising a carrier member pivoted to the door at the sides of the opening therein, guide means connected to a fixed support and to said carrier for maintaining the same in a substantially upright position as the door is opened and closed, an ash receptacle removably supported by the carrier and having an ash receiving opening therein adapted to be exposed outside said door when the door is closed, a cover for the receptacle opening pivoted to said carrier and movable through the opening in the door for closing or exposing said receptacle opening, cooperating elements on said door and cover for pivoting said cover to a position exposing the receptacle and its opening to permit access to and removal of said receptacle when the door is opened, and cooperating elements on said door and cover for pivoting said cover to its closed position as the door is moved from its open to its closed position.

6. In combination with a hinged door having an opening therein, a carrier member pivoted to the door, guide means connected to a fixed support and to said carrier for maintaining the same in a substantially upright position as the door is opened and closed, and a receptacle removably supported by the carrier and disposed within said opening and having an opening therein adapted to be exposed outside said door when the door is closed, a cover for the receptacle opening pivoted to said carrier and movable through the opening in the door for closing or exposing said receptacle opening, cooperating elements on said door and cover for pivoting said cover to a position exposing the receptacle and its opening to permit access to and removal of said receptacle when the door is opened, and cooperating elements on said door and cover for pivoting said cover to its closed position as the door is moved from its open to its closed position.

7. In combination with a horizontally hinged door having an opening therein, an ash tray assembly pivoted to the door and arranged within said opening, and guide means connected to a fixed support and to the ash tray assembly for maintaining said assembly in an upright position as the door is opened and closed, said assembly including an ash receptacle having an ash receiving opening therein adapted to be exposed outside said door when the door is in its closed position.

8. In combination with a door adapted to be hinged at one edge to a panel having an opening adapted to be closed by the door, said door having an opening therein, an ash tray assembly arranged within the opening in the door and comprising a carrier member pivoted to the door for pivotal movement through the opening therein as the door is opened and closed, guide means connecting said carrier to a fixed support for maintaining said carrier in a substantially upright position within said door opening as the door is opened and closed, and an ash receptacle removably supported by the carrier and having an ash receiving opening therein adapted to be exposed outside said door when the door is closed, said receptacle and its opening being exposed on the inner side of said door to permit access to and removal of said receptacle when said door is open.

9. An assembly according to claim 8 including a cover movably mounted on said carrier and movable between positions closing and exposing said receptacle opening when the door is closed.

10. An assembly according to claim 9 including means for shifting said cover to a position thereof exposing said receptacle and its opening as the door is opened.

11. An assembly according to claim 9 including means for shifting said cover to a position thereof closing said receptacle opening as said door is closed.

12. In an automotive vehicle including a dash panel having an opening therein; a door for closing said opening and hingedly connected to said panel on a horizontal axis, said door having an opening therein, an ash tray assembly pivoted to the door on a horizontal axis and arranged within the opening in said door, and link means pivoted to the ash tray assembly and to a fixed part of the vehicle for maintaining said assembly in an upright position as the door is opened and closed, said assembly including an ash receptacle having an ash receiving opening therein adapted to be exposed outside said panel when the door is in its closed position.

13. In an automotive vehicle having a dash panel provided with an opening; a door for closing said opening and hingedly connected to said panel, said door having an opening therein, an ash tray assembly pivoted to the door and arranged within the opening in said door, and means connecting the ash tray assembly to a fixed part of the vehicle for effecting pivotal movement of said assembly relative to said door as the door is opened and closed, said assembly including an ash receptacle having an ash receiving opening therein adapted to be exposed outside said panel when the door is in its closed position.

14. Ash tray construction according to claim 13 including a cover for said receptacle opening movably mounted on said assembly and movable through the opening in said door for selectively closing or exposing said receptacle opening.

15. Ash tray construction according to claim 14 including means for moving said cover to a position thereof exposing said receptacle as said door is moved from its closed to its open position.

16. Ash tray construction according to claim 15 including means for moving said cover to its closed position as said door is moved from its open to its closed position.

17. In an automotive vehicle having a dash panel and an opening in said panel; a door for closing said opening and hingedly connected to said panel, said door having an opening therein, an ash tray assembly pivoted to the door and arranged within the opening in said door, and means connected to the ash tray assembly and to a fixed part of the vehicle for maintaining said assembly in a substantially upright position within said opening as the door is opened and closed.

References Cited in the file of this patent
UNITED STATES PATENTS

| | | |
|---|---|---|
| 1,600,446 | Wood | Sept. 21, 1926 |
| 1,708,895 | Phillips | Apr. 9, 1929 |
| 1,755,475 | Fairleigh | Apr. 22, 1930 |
| 1,898,224 | Stubbs | Feb. 21, 1933 |
| 2,136,558 | Manshel | Nov. 15, 1938 |
| 2,145,674 | Visser | Jan. 31, 1939 |